(12) United States Patent
Macharia et al.

(10) Patent No.: US 9,014,858 B2
(45) Date of Patent: Apr. 21, 2015

(54) ENERGY OPTIMIZER FOR DEHYDRATING BIOFUELS THROUGH DISTILLATION TOWERS AND MOLECULAR SIEVES

(75) Inventors: Maina A. Macharia, Round Rock, TX (US); Zhaozhi Wei, Austin, TX (US); Donald Melvin Maxwell, Scottsdale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1542 days.

(21) Appl. No.: 12/242,531

(22) Filed: Sep. 30, 2008

(65) Prior Publication Data

US 2010/0082139 A1    Apr. 1, 2010

(51) Int. Cl.
| | |
|---|---|
| G05B 13/00 | (2006.01) |
| G05B 15/00 | (2006.01) |
| G05B 11/00 | (2006.01) |
| G05B 21/00 | (2006.01) |
| G05B 17/02 | (2006.01) |

(52) U.S. Cl.
CPC ..................................... *G05B 17/02* (2013.01)

(58) Field of Classification Search
USPC ................... 700/270, 271, 272, 273
See application file for complete search history.

(56) References Cited

U.S. PATENT DOCUMENTS

| | | |
|---|---|---|
| 3,379,421 A | 4/1968 | Putman |
| 6,496,781 B1 | 12/2002 | Chen et al. |
| 2004/0033457 A1 | 2/2004 | Zhang et al. |
| 2007/0078530 A1 | 4/2007 | Blevins et al. |
| 2008/0028675 A1 | 2/2008 | Clifford et al. |
| 2008/0103747 A1 | 5/2008 | Tay et al. |
| 2008/0103748 A1 | 5/2008 | Axelrud et al. |
| 2008/0104003 A1 | 5/2008 | Macharia et al. |
| 2008/0108048 A1 | 5/2008 | Bartee et al. |
| 2008/0109100 A1 | 5/2008 | Macharia et al. |
| 2008/0109200 A1 | 5/2008 | Bartee et al. |
| 2008/0167852 A1 | 7/2008 | Bartee et al. |

FOREIGN PATENT DOCUMENTS

EP    0303345 A2    2/1989

OTHER PUBLICATIONS

Karuppiah, R., et al. "Energy optimization for the design of corn-based ethanol plants." AIChE Journal 54.6 (2008): 1499-1525.*
Kwiatkowski, Jason, et al. "Modeling the Process and Costs of the Production of Fuel Ethanol by the Corn Dry-Grind Process." Industrial Crops and Products 23.3 (2006): 288-296.*

(Continued)

*Primary Examiner* — In Suk Bullock
*Assistant Examiner* — Robert Eom
(74) *Attorney, Agent, or Firm* — Fletcher Yoder P.C.

(57) ABSTRACT

The present invention provides novel techniques for controlling the balance between energy usage and biofuels dehydration between a distillation process unit and molecular sieves with model predictive control technology. In particular, the present techniques are presented in the context of biofuel production, wherein control of the balance between energy usage and water removal in biofuel production may be optimized. However, the present techniques may also be applied to any other suitable applications, such as liquor processing, where energy may be used to remove water from the liquor.

6 Claims, 6 Drawing Sheets

(56) References Cited

OTHER PUBLICATIONS

Maiti et al., Adaptive dynamic matrix control of a distillation column with closed-loop online identification, Journal of Process Control, vol. 5, Issue 5, Oct. 1995, pp. 315-327.*

U.S. Appl. No. 12/052,117, filed Mar. 20, 2008, Stephenson et al.
U.S. Appl. No. 12/052,159, filed Mar. 20, 2008, Stephenson et al.
U.S. Appl. No. 12/165,371, filed Jun. 30, 2008, Macharia et al.

* cited by examiner

ENERGY OPTIMIZER FOR DEHYDRATING BIOFUELS THROUGH DISTILLATION TOWERS AND MOLECULAR SIEVES

BACKGROUND

The present invention relates generally to control systems, and more particularly to model predictive control employing novel techniques for optimizing energy usage and water removal in a distillation process system and a molecular sieve operation.

Many processing applications, such as biofuel production, include sub-processes where energy may be used to remove water from a product, such as biofuel, to meet the moisture specification of the final product. Multiple sub-processes may be used to remove water from the product. However, these sub-processes may be characterized by varying rates of energy usage as well as varying rates of biofuels dehydration. Therefore, balancing biofuels dehydration through multiple sub-processes, such as distillation towers and molecular sieves, is a dynamic process control challenge. A main issue in the control of such systems may be dehydrating the biofuels product to the commercial specification of moisture allowable in the product through multiple sub-processes at the minimal energy requirement. However, due to interdependencies between the sub-processes, as well as particular characteristics of each sub-process, such as equipment constraints or the availability of processing energy in each sub-process, controlling the balance between energy usage and water removal may be more complex than simply maximizing the use of the "most efficient" sub-processes.

BRIEF DESCRIPTION

The present invention provides novel techniques for controlling the balance between energy usage and biofuels dehydration between a distillation process unit and molecular sieves with model predictive control technology. In particular, the present techniques are presented in the context of biofuel production, wherein control of the balance between energy usage and water removal in biofuel production may be optimized.

In general, the present techniques provide a method for controlling energy usage and biofuels dehydration in a biofuel production process. The method includes determining energy usage rates of distillation towers and molecular sieves in the biofuel production process. The method also includes determining rates of water removal from biofuel in the distillation towers and molecular sieves. The method further includes determining target values for operating parameters of the distillation towers and molecular sieves. In addition, the method includes controlling operating parameters of the distillation towers and the molecular sieves based on the target value determinations.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
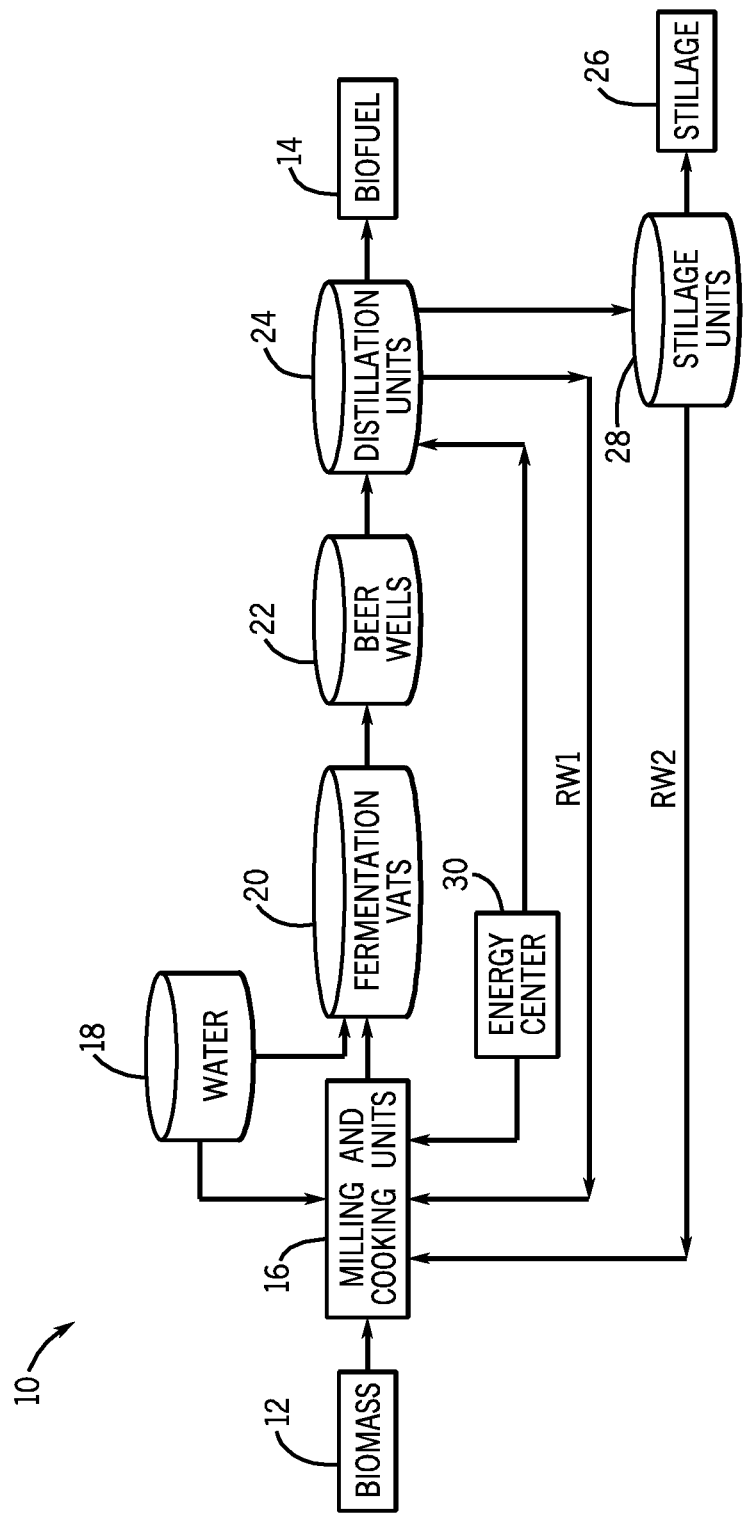
FIG. 1 is a diagram of an exemplary distillation process production plant.

Turning now to the drawings, FIG. 1 is a diagram of an exemplary biofuel production plant 10, illustrating how biomass 12 may be processed through several stages to produce biofuel 14. Biomass 12 may first be provided to a milling and cooking process, e.g., milling and cooking units 16, where water 18 (and possibly recycled water RW1 and RW2) may be added and the biomass 12 may be broken down to increase the surface area-to-volume ratio. This increase in surface area may allow for sufficient interaction of the water 18 and biomass 12 surface area to achieve a solution of fermentable sugars in water 18. The mixture, a biomass 12 and water 18 slurry, may be cooked to promote an increase in the amount of contact between the biomass 12 and water 18 in solution and to increase the separation of carbohydrate biomass from non-carbohydrate biomass. The output of the milling and cooking units 16 (i.e., the fermentation feed or mash) may then be sent to a fermentation process, where one or more fermentation vats 20 may operate to ferment the biomass/water mash produced by the milling and cooking units 16.

The fermentation process may require additional water 18 to control the consistency of material to the fermentation vats 20 (also referred to herein as a fermenter or fermentation tank). Biomass 12 may be converted by yeast and enzymes into a biofuel 14 and by-products such as carbon dioxide, water and non-fermentable biomass (solids), in the fermentation vats 20. The fermentation process is a batch process and may include multiple fermenters operating in parallel. The batch start times may be staggered in order to optimize the utilization of the capacity of the beer wells 22 and smoothly distribute the flow of fermentation feed to the fermentation process and the flow of biofuel 14 and stillage as output from the fermentation process.

After being temporarily stored in the beer wells 22, the output from the fermentation vats 20 may be sent to a distillation process, e.g., one or more distillation units 24, to separate biofuel 14 from water 18, carbon dioxide, and non-fermentable solids. If the biofuel 14 has to be dehydrated to moisture levels less than 5% by volume, the biofuel 14 may be processed through a processing unit called a molecular sieve or similar processing units (not shown). The finalized biofuel 14 may then be processed to ensure it is denatured and not used for human consumption.

The distillation units 24 may separate the biofuel 14 from water 18. Water 18 may be used in the form of steam for heat and separation, and the condensed water may be recycled (RW1) back to the milling and cooking units 16. Stillage 26 (non-fermentable solids and yeast residue), the heaviest output of the distillation units 24, may be sent to stillage processing units 28 for further development of co-products from the biofuel 14 production process.

The stillage processing units 28 may separate additional water from the cake solids and recycle the water (RW2) back to the milling and cooking units 16. Several stillage processing options may be utilized, including: (1) selling the stillage with minimal processing and (2) further processing the stillage by separating moisture from the solid products via one or more centrifuge units (not shown). Using the centrifuge units, the non-fermentable solids may be transported to dryers (not shown) for further moisture removal. A portion of the stillage liquid (concentrate) may also be recycled back to the fermentation vats 20. However, the bulk of the flow may generally be sent to evaporator units (not shown), where more liquid may be separated from the liquid stream, causing the liquid stream to concentrate into syrup, while solid stillage may be sent to a drying process, e.g., using a drying unit or evaporator, to dry the solid stillage to a specified water content. The syrup may then be sent to a syrup tank (not shown). Syrup in inventory may be processed using a number of options. For instance, the syrup may be: (1) sprayed in dryers to achieve a specified color or moisture content, (2) added to the partially dried stillage product, or (3) sold as a separate liquid product. The evaporator units may have a water by-product stream that is recycled back to the milling and cooking units 16.

An energy center 30 may supply energy to many of the processing units, e.g., the milling and cooking units 16, the distillation units 24 and mole-sieve units, and the stillage processing units 28. The energy center 30 may constitute a thermal oxidizer unit and heat recovery steam generator (HRSG) that may destroy volatile organic compounds (VOCs) and provide steam to the evaporators, distillation units 24, cooking system units (e.g., in 16), and dehydration units. The energy center 30 may typically be the largest source of heat in a biofuel plant 10.

Figure 2:
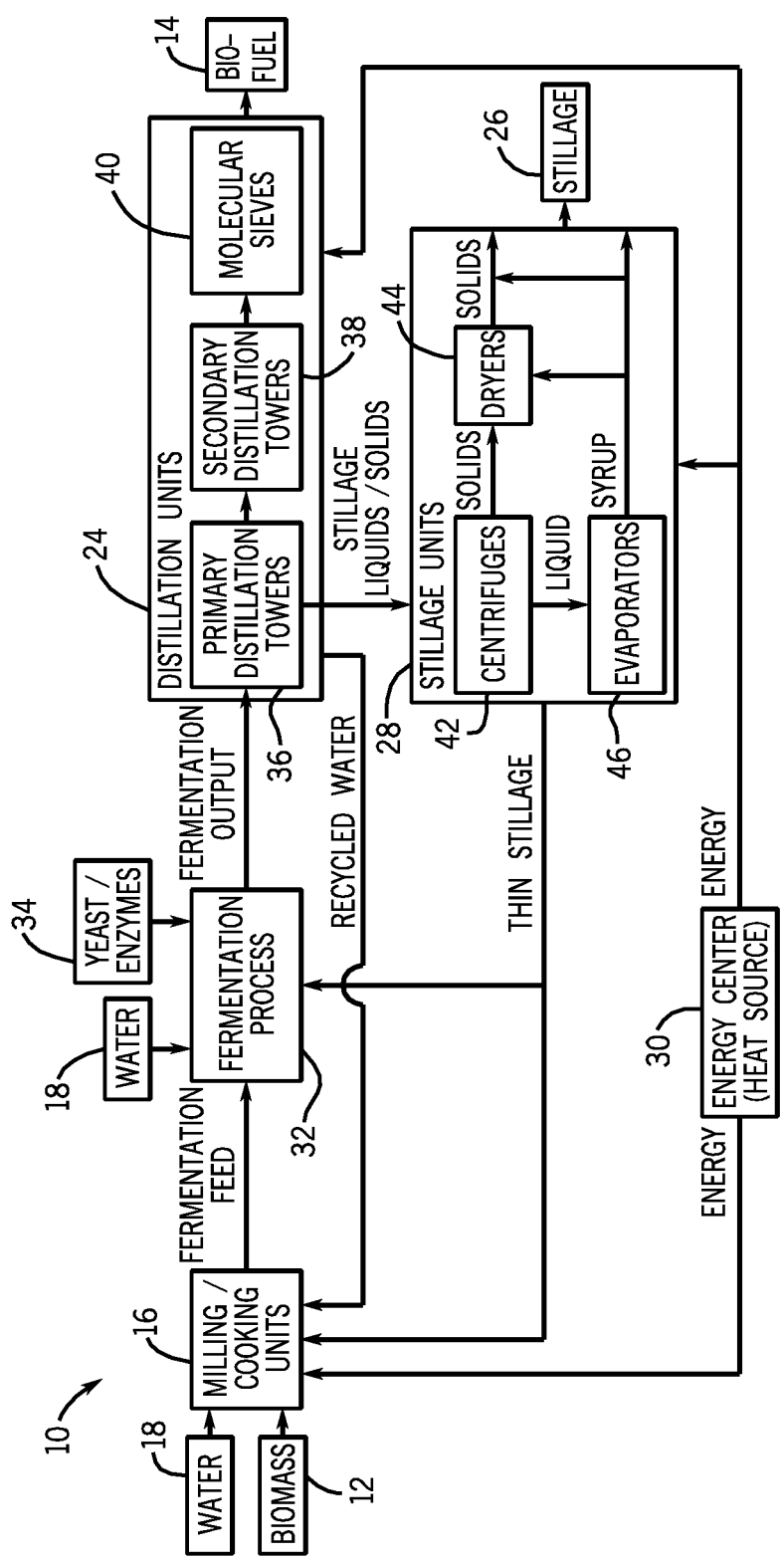
FIG. 2 is a more detailed process flow diagram of sub-processes of an exemplary production plant.

FIG. 2 is a more detailed process flow diagram of sub-processes of an exemplary biofuel production plant 10. It should be noted that the particular components, processes and sub-processes shown are merely meant to be exemplary and are not intended to be limiting. The milling and cooking units 16 may receive water 18, biomass 12, energy (electrical and/or thermal), recycled water, and/or recycled thin stillage, mill the biomass, cook the mixture, and output a biomass slurry (referred to as fermentation feed) to the fermentation process 32, which may include the fermentation vats 20 and beer wells 22 shown in FIG. 1. The fermentation process 32 may receive the biomass slurry, water 18, yeast and enzymes 34, and recycled thin stillage, ferment the mixture, and output fermentation products to the distillation units 24. The distillation units 24 may receive the fermentation products, remove water and stillage (liquid and solid stillage) from the fermentation products in a one- to three-step process (e.g., primary distillation towers 36, secondary distillation towers 38, and/or molecular sieves (dryers) 40), recycle water removed from the fermentation products to the milling and cooking units 16, output the liquid and solid stillage to the stillage processing units 28, and output biofuel 14. The stillage processing units 28 may receive the liquid and solid stillage, process the liquid and solid stillage (utilizing one or more of centrifuge dryers 42, other dryers 44, and/or evaporators 46) to produce and output various stillage 26, and recycle thin stillage liquid to the fermentation process 32 and the milling and cooking units 16. As in FIG. 1 above, the energy center 30 may provide electric power and heat (steam) to the various sub-processes as shown in FIG. 2.

The distillation units 24, which may include primary and secondary distillation towers 36 and 38, may receive the output of the fermentation process 32 (a mixture of biofuel, stillage, and water) and may separate the biofuel 14 from the water and stillage. Stillage may be removed from the primary distillation towers 36 and sent to the stillage processing units 28. Energy may be provided to the distillation units 24 from the energy center 30 and may be primarily used by one or more primary distillation towers 36. The energy may typically be delivered to the primary distillation towers 36 in the form of a steam flow through heat exchangers (not shown), but in some embodiments the steam flow may be added directly to the primary distillation towers 36. Energy may also be recycled to the distillation units 24 from other process flows or provided by other heat sources as needed or desired. The flashed overhead vapor from the primary distillation towers 36 may be transferred to one or more secondary distillation towers 38 (also referred to as the rectifier and side stripper columns). In the secondary distillation towers 38, energy may be provided by heat exchangers utilizing steam and/or heat recovery from other processes, such as the milling and cooking units 16 and/or the stillage processing units 28 utilizing energy recovery streams. The overhead vapor from the primary distillation towers 36 may be a high-purity biofuel (such as an ethanol/water mixture) which may be distilled close to its azeotropic point, but generally below fuel specification requirements. The bottom product stream of the secondary distillation towers 38 may be primarily condensed water. This condensed water may be recycled back to the milling and cooking units 16.

The overhead vapor from the primary distillation towers 36 and the secondary distillation towers 38 may be routed to inventory tanks (not shown) which may be used as surge reservoirs to regulate the feed flow rates between the distillation units and the one or more dehydration units. The dehydration units may be molecular sieve units 40 or other downstream dehydration processing units (e.g., extractive distillation). Molecular sieve units 40 may include an energy-efficient process unit which operates in gas phase using a dehydration process known as pressure swing adsorption (PSA). If the biofuel is ethanol, it may be dehydrated in either the liquid or gas phase. In certain embodiments, molecular sieve units 40 may absorb water in the biofuel vapor such that the resulting biofuel 14 may have only a trace amount of water. When the molecular sieve units 40 become saturated with water, they may be taken offline, replaced with a parallel regenerated unit, and then placed back online. The offline units may be regenerated under conditions that release moisture and allow the units to dry and be ready for future online use. PSA regeneration units may be adjusted to affect the efficiency and capacity of the molecular sieve units 40. The produced biofuel 14 may then be sent to final storage in product inventory tanks (not shown) and/or directed toward additional processing units.

Equipment for processing stillage may include one or more centrifuges 42, one or more evaporators 46, and zero, one, or more dryers 44. The one or more centrifuges 42 may receive a stillage feed (a mixture of liquid and solid stillage) from the bottom outputs of the primary distillation towers 36. The stillage feed from the primary distillation towers 36 may be routed to inventory tanks (not shown) which may be used as surge reservoirs to regulate the stillage feed flow rates between the primary distillation towers 36 and the centrifuges 42. The one or more centrifuges 42 may separate liquids from the stillage feed, output the thin stillage liquids, and output the remaining solids (dewatered stillage, also referred to as wet cake). The solids (including moisture and non-fermentable solids) may be sent to the dryers 44. Part of the thin stillage liquids may be recycled back to the fermentation process 32 and/or the milling and cooking units 16 and the balance may be sent to the one or more evaporators 46 to evaporate moisture from the liquids to form concentrated syrup. The syrup may be sent to a syrup inventory unit (not shown) before being combined with the dewatered stillage in the dryers 44, combined with the dried stillage output from the dryers 44, and/or sold as a stand-alone product. The stillage sub-process equipment may also include various heaters (not shown) and combustors (not shown) for the destruction of volatile organic compounds in the vapors from the drying stillage in the one or more evaporators 46 or dryers 44.

One or more of the processes described above may be managed and controlled via model predictive control utilizing a dynamic multivariate predictive model that may be incorporated as a process model in a dynamic predictive model-based controller. Model predictive control of sub-processes in a biofuel production process is described in greater detail below. In particular, various systems and methods are provided for using model predictive control to improve the yield, throughput, energy efficiency, and so forth of biofuel sub-processes in accordance with specified objectives. These objectives may be set and various portions of the processes controlled continuously to provide real-time control of the production process. The control actions may be subject to or limited by plant and external constraints.

Each of the illustrated sub-processes may operate within the larger biofuel production process to convert biomass 12 to biofuel 14 and possibly one or more co-products. Thus, the biofuel production plant 10 may typically include four general plant sections: milling/cooking, fermentation, distillation/sieves, and stillage processing. Each of these sub-processes may be at least partially dependent upon operation of one or more of the other sub-processes. Moreover, operating conditions that may be optimal for one sub-process may entail or cause inefficiencies in one or more of the other sub-processes. Thus, a plant bottleneck, meaning a local limitation that limits or restricts a global process, may occur in any of the above four sub-processes, thus limiting the overall operation of the biofuel production plant 10.

Thus, an operating challenge for biofuel production is to manage the various sub-processes, and possibly the entire system or process, to automatically respond to a constraint or disruption in the production system or process. As described in greater detail below, integrated model predictive control may be used to manage the biofuel production process in a substantially optimal manner, balancing various, and possibly competing, objectives of the sub-processes to approach, meet, and/or maintain objectives for the overall process. More specifically, the disclosed embodiments of model predictive control may be used to manage the balance between energy usage and water removal in the distillation process.

The control of these sub-processes may be performed manually, e.g., based on decisions of a human operator, or may only be locally automated, e.g., via proportional-integral-derivative (PID) inventory controls of fermentation inventory and fermentation feed inventory. However, given the complexity of the relationships among the many factors or variables, such manual control generally results in significant inefficiencies, sub-optimal yields, etc.

Figure 3:
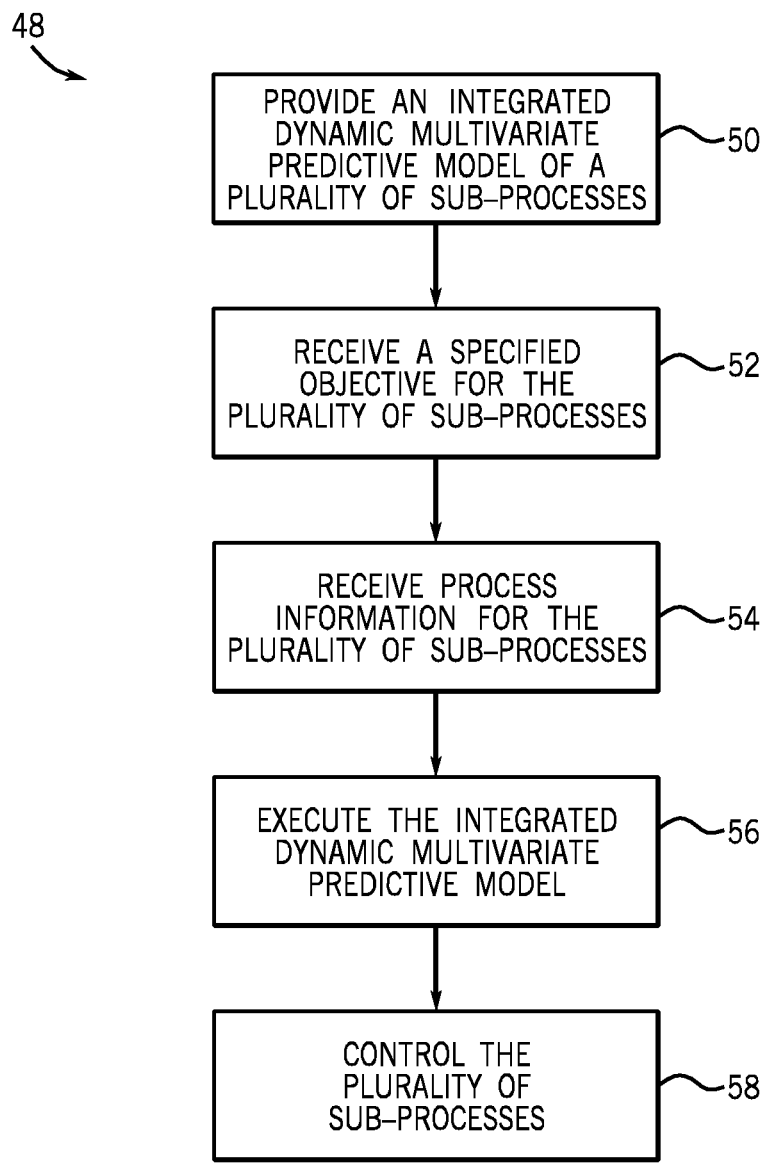
FIG. 3 is a flowchart of an exemplary method for integrated model predictive control of a biofuel production process.

FIG. 3 is a flowchart of an exemplary method 48 for such integrated model predictive control of a biofuel production process. More specifically, embodiments of the method 48 may apply model predictive control techniques to manage multiple sub-processes of the biofuel production process in an integrated manner. Note that in various embodiments, many of the method steps may be performed concurrently, in a different order than shown, or may be omitted. Additional method steps may also be performed.

In step 50, an integrated dynamic multivariate predictive model representing a plurality of sub-processes of the biofuel production process may be provided. In other words, a model may be provided that specifies or represents relationships between attributes or variables related to the sub-processes, including relationships between inputs to the sub-processes and resulting outputs of the sub-processes.

The model may be of any of a variety of types. For example, the model may be linear or nonlinear, although for most complex processes, a nonlinear model may be preferred. Other model types contemplated include fundamental or analytical models (i.e., functional physics-based models), empirical models (such as neural networks or support vector machines), rule-based models, statistical models, standard model predictive control models (i.e., fitted models generated by functional fit of data), or hybrid models using any combination of the above models.

The integrated dynamic multivariate predictive model may include a set of mathematical relationships that includes steady state relationships and may also include the time lag relationship for each parameter change to be realized in the output. A great variety of dynamic relationships may be possible and each relationship between variables may characterize or capture how one variable may affect another and also how fast the effects may occur or how soon an effect may be observed at another location.

The integrated dynamic multivariate predictive model may be created from a combination of relationships based on available data such as fundamental dynamic and gain relationships, available plant historic process data, and supplementary plant testing on variables that may not be identified from the two previous steps. Models may be customized to the plant layout and design, critical inventories, plant constraints and measurements, and controllers available to manage variables. Moreover, in some embodiments, external factors, such as economic or regulatory factors, may be included or represented in the model.

An important characteristic of the integrated dynamic multivariate predictive model may be to identify when a control variable changes as a result of a change in one or more manipulated variables. In other words, the model may identify the time-response (e.g., time lag) of one or more attributes of a sub-process with respect to changes in manipulated variables. For example, once a controller adjusts pump speeds, there may be a certain time-dependent response before observing an effect at a tank being filled. This time-dependent response may be unique for each independent controller. For instance, flow rates may vary because of differences in system variables (e.g., piping lengths, tank volumes, and so forth) between the control actuator and sensor and the pump location.

With respect to the distillation/dehydration sub-processes discussed above, distillation feed tank levels and individual feeds to distillation units may be managed through calculations of the integrated dynamic multivariate predictive model. However, there may be other process disturbances that may remain unmeasured. For example, a situation may occur where a tank level starts to rise out of balance with filling demand (e.g., because of manual plant changes such as scheduled equipment cleaning that involves draining and/or filling one or more specific tanks). In this situation, the integrated dynamic multivariate predictive model may be made aware of the imbalance so that corrective actions may be made gradually to avoid dramatic or critical consequences. This may, for instance, be an issue for many of the tanks that have both batch and continuous plant operations in sequence. Specific tanks may be used to provide storage capacity to facilitate balancing and avoid continuous out-of-control operations after every batch action. Because batch vessels may drain rapidly, specific tank levels may be difficult to maintain in automatic level control. Thus, real-time receipt of current vessel and material balance information (flows and levels) may provide an update on current equipment status and the execution of the integrated dynamic multivariate predictive model may enable projections to be made to avoid both emptying/over-filling vessels and large emergency flow moves to correct imbalances.

In certain embodiments, the integrated dynamic multivariate predictive model may include inferential models (also referred to as property approximators or virtual online analyzers (VOAs)). An inferential model may be a computer-based model which calculates inferred quality properties from one or more inputs of other measured properties (e.g., process stream or process unit temperatures, flows, pressures, concentrations, levels, and so forth). For example, in one embodiment, these inferential models may compute the real-time properties of one or more properties from a list of properties comprising primary distillation tower 36 biofuel concentration in the bottom product stream, secondary distillation tower 38 biofuel concentration in the overhead product stream, secondary distillation tower 38 biofuel concentration in the bottom product stream, product stream off the molecular sieve units 40, and/or product stream quality off an extractive distillation, among others. In certain embodiments, the integrated dynamic multivariate predictive model may be subdivided into different portions and stored in a plurality of memories. The memories may be situated in different locations of the biofuel production plant 10. The controller may communicate with the memories utilizing a communication system.

In step 52, a specified objective for the plurality of sub-processes may be received. The objective may specify a desired behavior or outcome of the biofuel production process. In certain embodiments, the objective may be somewhat complex or compound. For example, the objective may include a global objective and a plurality of sub-objectives directed to at least a subset of the plurality of sub-processes. In other words, the specified objective may include an overall objective for the biofuel production process, e.g., maximize throughput, efficiency, and so forth, and may also include various subsidiary objectives related specifically to the respective sub-processes. In addition, the sub-objectives may be mutually exclusive or competitive with respect to each other and/or with respect to the global objective.

Exemplary objectives may include, but are not limited to, one or more operator specified objectives, one or more predictive model specified objectives, one or more programmable objectives, one or more target feed rates, one or more cost objectives, one or more quality objectives, one or more equipment maintenance objectives, one or more equipment repair objectives, one or more equipment replacement objectives, one or more economic objectives, one or more target throughputs for the biofuel production process, one or more objectives in response to emergency occurrences, one or more dynamic changes in materials inventory information, one or more dynamic changes in available process energy constraints, or one or more dynamic changes in one or more constraints on the biofuel production process, and so forth.

With respect to the distillation/dehydration sub-processes, the objectives may be specified by a human operator and/or a program, and in some embodiments the objectives may include one or more sub-objectives. The objectives may include one or more of combined feed rate to the primary distillation towers 36, individual feed rates to each primary distillation tower 36, heating load of the primary distillation towers 36, flow rate of non-fermentable solids output, rate of loss of biofuel into the non-fermentable solids output from the primary distillation towers 36, distillation base ethanol concentration of output of the primary distillation towers 36, water content of the biofuel stream off the secondary distillation towers 38, rate of loss of biofuel in condensed water output from the secondary distillation towers 38, water content in one or more output biofuel products, flow rates and inventories of one or more output biofuel products, and/or purity specification of one or more output biofuel products. In particular, in certain embodiments, a specific objective may include the maximization of water removal in the distillation/dehydration sub-processes and the minimization of energy usage within these sub-processes.

In step 54, process information related to the plurality of sub-processes may be received from the biofuel production process. This process information may be any type of process information, including state or condition information measured by sensors (e.g., temperatures, pressures, real-time measurements of the biofuel in the fermentation system, and so forth), computed algorithmically, inferred from models (i.e., inferential models), taken from lab values, entered by operators, and so forth. The process information may further include equipment settings, flow rates, material properties (e.g. densities), content profiles, purity levels, ambient conditions (e.g., time of day, temperature, pressure, humidity, and so forth), economic or market conditions (e.g., cost of materials or product), and so forth. In other words, the process information may include any information that affects or influences any part of the biofuel production process.

More specifically, the process information may include measurements of one or more control variables and one or more manipulated variables related to the sub-processes and one or more variables of other processes that may impact the sub-processes, as well as information from inferential models, laboratory results, and so forth. With respect to the distillation/dehydration sub-processes discussed above, the measured variables may include distillation unit feed rates; distillation feed temperatures; heat input to the primary distillation towers 36; heat input to the secondary distillation towers 38; heat input to the dehydration units; output flow rate of non-fermentable solids; the loss of biofuel into stillage (which may be the product from the bottom of the primary distillation towers 36); the water content of the biofuel stream off the secondary distillation towers 38; the loss of biofuel to the secondary distillation towers 38 bottom product stream; column reflux of the distillation units 24; pump speed, valve position, or other controller output within the distillation or dehydration systems; pressure drop within the distillation section or piping sections; column pressure; distillation base biofuel concentration of output of primary distillation units 36; biofuel product composition from one or more primary distillation towers 36, biofuel product composition from one or more secondary distillation towers 38; biofuel product composition from one or more dehydration units; process heating limits of the distillation/dehydration process units; pressure limits of the distillation/dehydration process units; pressure drop limitation of the vaporized feed in the dehydration units; limits of the dehydration feed systems; water content of the one or more output biofuel products; purity specification of one or more output biofuel products; and/or the inventory of one or more output biofuel products, among others. The process information may be communicated to the controller from a distributed control system.

In step 56, the integrated dynamic multivariate predictive model may be executed in accordance with the objective using the received process information as input, thereby generating model output comprising target values of one or more controlled variables related to one or more of the plurality of sub-processes in accordance with the objective. In other words, the model may be executed to determine target values for manipulated variables for one or more of the sub-processes that may be used to control the sub-processes in such a way as to attempt to meet the specified objective.

For example, in an embodiment where the objective is to maximize water removal in the distillation/dehydration sub-process, the model may determine various target values (e.g., sub-process material input flows, temperatures, pressures, and so forth) that may operate to maximize the water removal. As another example, in an embodiment where the objective is to minimize energy usage for the distillation/dehydration sub-process, the model may determine target values that may operate to minimize energy usage of the distillation/dehydration sub-process, possibly at the expense of water removal of the distillation/dehydration sub-process. In a further example, the objective may be to maximize profit for the entire biofuel production process, where maximizing water removal and minimizing energy usage may be two, possibly competing, sub-objectives, e.g., included in the objective.

It should be noted that as used herein, the terms "maximum," "minimum," and "optimum," may refer respectively to "substantially maximum," "substantially minimum," and "substantially optimum," where "substantially" indicates a value that is within some acceptable tolerance of the theoretical extremum, optimum, or target value. For example, in one embodiment, "substantially" may indicate a value within 10% of the theoretical value. In another embodiment, "substantially" may indicate a value within 5% of the theoretical value. In a further embodiment, "substantially" may indicate a value within 2% of the theoretical value. In yet another embodiment, "substantially" may indicate a value within 1% of the theoretical value. In other words, in all actual cases (non-theoretical), there are physical limitations of the final and intermediate control element, dynamic limitations to the acceptable time frequency for stable control, or fundamental limitations based on currently understood chemical and physical relationships. Within these limitations, the control system will generally attempt to achieve optimum operation, i.e., operate at a targeted value or constraint (maximum or minimum) as closely as possible.

In step 58, the plurality of sub-processes of the biofuel production process may be controlled in accordance with the target values and the objective. In other words, a controller (or a plurality of controllers) may modulate or otherwise control various operational aspects of the sub-processes in accordance with the target values of the manipulated variables. In some embodiments, the target values may simply be used as set points by the controller. In other words, the controller may set respective inputs of the various sub-processes to the respective target values. For example, controlling the plurality of sub-processes of the biofuel production process in accordance with the target values and the objective may include operating one or more controllers to control one or more of the following: one or more material feed rates, one or more water flows, one or more molecular sieve regenerations, one or more heat sources, and so forth.

With respect to the distillation/dehydration sub-processes discussed above, controlling the biofuel production process may include controlling, among other things, the flow rates of the distillation feed, the primary distillation tower 36 heat balance, the loss of biofuel into stillage, the water content of biofuel from the secondary distillation towers 38, the loss of biofuel to the secondary distillation tower 38 bottom product stream, the inventory of biofuel, the biofuel moisture quality, and so forth.

Steps 52, 54, 56, and 58 of the method 48 may be performed a plurality of times in an iterative manner to operate the biofuel production process in a substantially optimal fashion. In other words, the method 48 described above may be performed substantially continuously, such as at a specified frequency, providing control of the biofuel production process in substantially real time to optimize the biofuel production process with respect to the specified objective.

In embodiments where multiple objectives may be provided, possibly at odds with one another, an optimizer may be used to balance the various sub-objectives in attempting to meet the global objective. In other words, an optimizer may be used to determine how to compromise with respect to the various sub-objectives in attempting to achieve the global objective. Thus, in certain embodiments, executing the integrated dynamic multivariate predictive model may include an optimizer executing the integrated dynamic multivariate predictive model to generate the model output. The generated model output may include the target values of one or more variables related to one or more of the plurality of sub-processes in accordance with the global objective and the plurality of sub-objectives. In certain embodiments, the optimizer may execute the integrated dynamic multivariate predictive model a plurality of times in an iterative manner. For example, the optimizer may repeatedly execute the model using various inputs and compare the resulting outputs to the specified objective (including the sub-objectives), thereby searching the solution space for input configurations that optimize the outcome, e.g., that allow the global objective to be met or at least approached, while minimizing the compromises made with respect to the various sub-objectives.

In certain embodiments, the method 48 may further include receiving constraint information specifying one or more constraints, such as limitations on one or more aspects or variables of the biofuel production process. The optimizer may execute the integrated dynamic multivariate predictive model in accordance with the objective using the received process information and the one or more constraints as input, thereby generating the model output in accordance with the objective and subject to the one or more constraints. The one or more constraints may include any such limitation on the biofuel production process including, but not limited to, one or more of: batch constraints (e.g., fermentation time), water constraints, feed constraints, equipment constraints, capacity constraints, temperature constraints, pressure constraints, energy constraints, market constraints, economic constraints, environmental constraints, legal constraints, operator-imposed constraints, and so forth. Furthermore, examples of equipment constraints may include, but are not limited to, one or more of: operating limits for pumps, operational status of pumps, tank capacities, operating limits for tank pressures, operational status of tanks, operating limits for valve pressures, operating limits for valve temperatures, operating limits for pipe pressures, operating limits for energy provision, operating limits for molecular sieves, and so forth. Moreover, in certain embodiments, the constraint information may include dynamic constraint information. In other words, some of the constraints may change dynamically over time. Therefore, the method 48 may automatically adjust operations taking into account these changing constraints.

In certain embodiments, the system may derive its measurements or process information from the process instruments or sensors, inferential models, real-time measurements of the biofuel in the fermentation system, and/or lab values, and execute linear or non-linear dynamic prediction models to solve an overall optimization objective which may typically be an economic objective function subject to dynamic constraints of the plant processes. The system may then execute the integrated dynamic multivariate predictive model, controller, and optimizer in accordance with the objective, e.g., the optimization function. For instance, the system may optimize water removal of the distillation/dehydration sub-processes with energy usage of the distillation/dehydration sub-processes.

Figure 4:
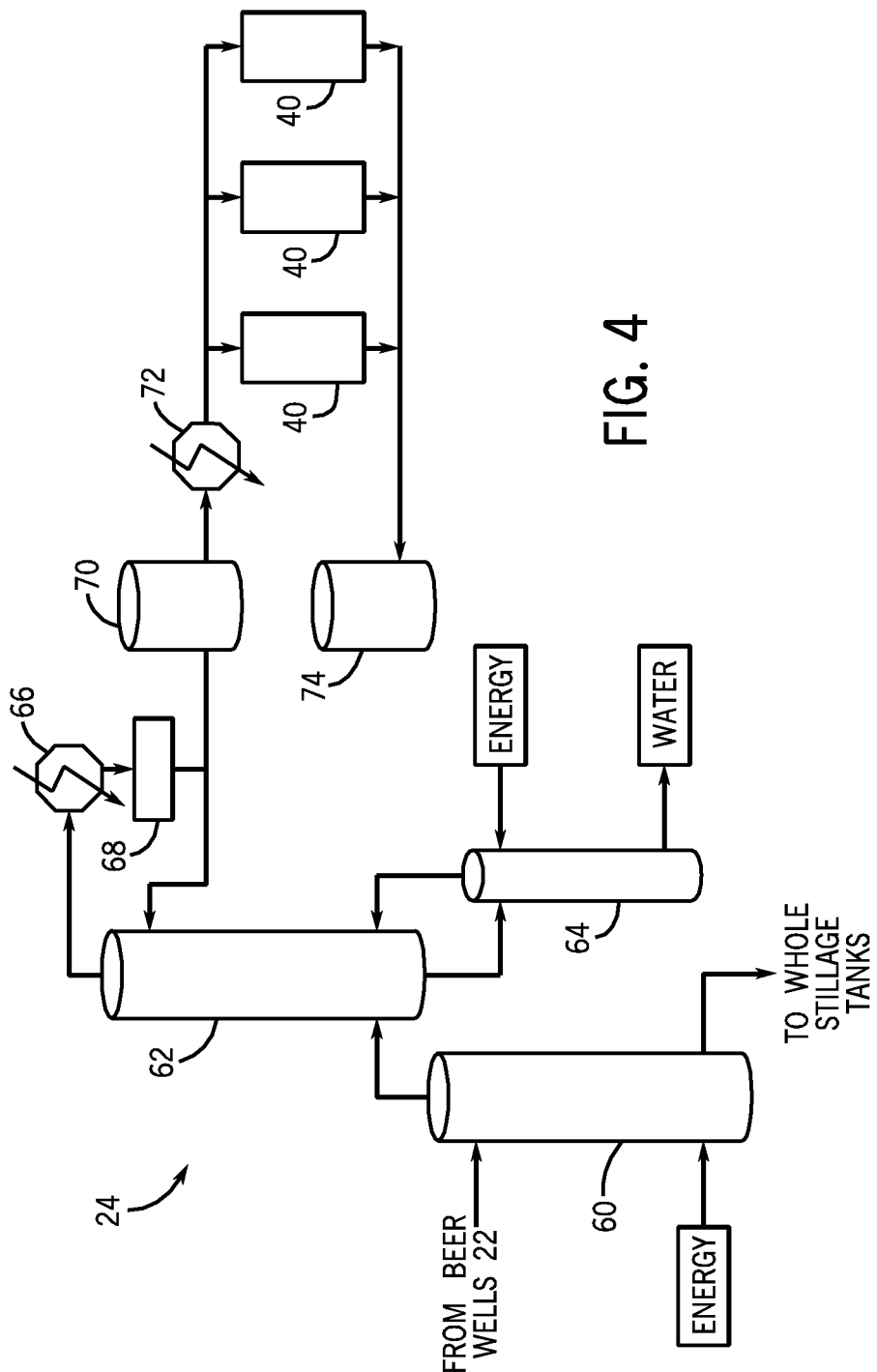
FIG. 4 is a more detailed process flow diagram of exemplary components of the distillation units of FIGS. 1 and 2, illustrating the distillation/dehydration sub-processes.

FIG. 4 is a more detailed process flow diagram of exemplary components of the distillation units 24 of FIGS. 1 and 2, illustrating the distillation/dehydration sub-processes. As described above, a primary function of the distillation units 24 is to separate biofuels from water. The heaviest product of the distillation units 24 is stillage which may be sent to the stillage processing units 28 (not shown in FIG. 4). The primary distillation tower, otherwise known as the beer column 60, is where the main source of energy for distillation may be added. The energy may often be evaporator steam but may also be any other heating media. The beer column 60 may receive fermentation product from the beer wells 22 and use the energy source to generate stillage, which may be sent to the whole stillage tanks. The beer column 60 may also generate a flashed vapor which may be directed into the secondary distillation towers and, more specifically, into a rectifier column 62. A separate energy source may not actually be applied at the rectifier column 62. Rather, the rectifier column 62 may function as a holding column which may circulate the flashed vapor between itself and a side stripper column 64. External energy sources (e.g., cook flash steam from the milling and cooking sub-processes, clean feed steam, and so forth) may be used by the side stripper column 64 to help separate condensed water from the flashed vapor. The condensed water may be recycled to the milling and cooking sub-processes. The overhead product from the rectifier and side stripper columns 62, 64 is often a high-purity biofuel which may be distilled close to its azeotropic point.

The high-purity biofuel from the rectifier column 62 may be directed through overhead condensers 66 and reflux drums 68 into the 190-proof inventory tanks 70. A certain amount of reflux may flow back into the rectifier column 62. The 190-proof inventory tanks 70 may be used as a surge reservoir to allow constant feed through sieve vaporizers 72 and into the molecular sieves 40. Within the molecular sieves 40, the biofuel may be dehydrated in either the liquid or gas phase. Perhaps the most energy-efficient method is to dehydrate the biofuel in the gas phase using the PSA techniques described above. Using these techniques, water may be absorbed into the molecular sieve 40 beds, thereby dehydrating the biofuel to a point where only a trace amount of water remains. When a set of molecular sieve 40 beds become saturated with water, they may be taken offline and a fresh set of molecular sieve 40 beds may be placed online. The offline beds may be regenerated under conditions that may release the moisture and allow the beds to dry and become ready for subsequent online use. PSA regeneration times may be adjusted in order to adjust the bed efficiency. From the molecular sieves 40, the biofuel product may be sent to the final storage tanks 74, where the biofuel may be held for final storage and processing.

Figure 5:
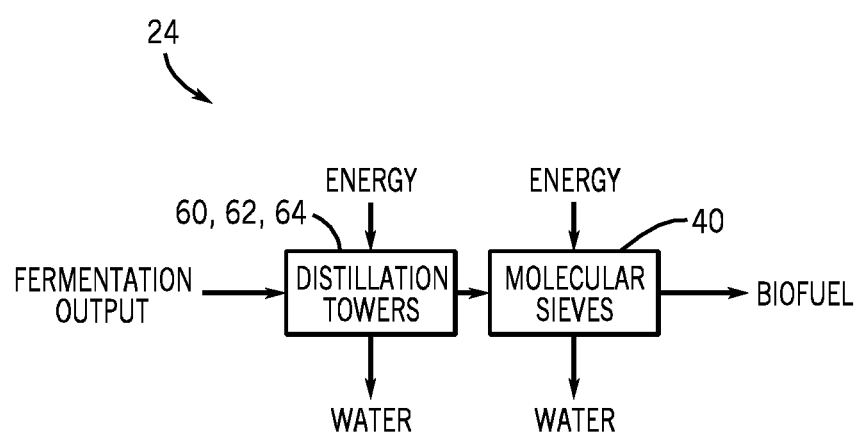
FIG. 5 is a process flow diagram of an exemplary dehydration sub-process as performed by the components of the distillation units illustrated in FIG. 4.

As shown in FIG. 4, various components of the distillation/dehydration sub-processes may contribute to not only the distillation of biofuel from the fermentation product, but also the removal of water from the produced biofuel. FIG. 5 is a process flow diagram of an exemplary dehydration sub-process as performed by the components of the distillation units 24 illustrated in FIG. 4. As described above, fermentation output from the fermentation process 32 of FIG. 2 may be directed into the distillation towers (e.g., the beer column 60, the rectifier column 62, and the side stripper column 64). Within the distillation towers 60, 62, 64, an energy source (e.g., steam) may be used to remove water (as well as stillage) from the fermentation product, thereby producing a high-purity biofuel. From the distillation towers 60, 62, 64, the high-purity biofuel may be directed into the molecular sieves 40, where additional energy sources may be used to further remove water, thereby producing a biofuel product.

Therefore, the dehydration sub-process may be performed primarily by two discrete sub-systems, the distillation towers 60, 62, 64 and the molecular sieves 40. However, the distillation towers 60, 62, 64 may only be capable of removing so much water due in part to the chemical bonding of ethanol and water and may, in fact, allow for water contents in the biofuel as high as 5-20%. In addition, the high-pressure distillation may be more expensive and may consume more energy than the molecular sieves 40. Therefore, in some instances, a decision may be made to separate less water using the distillation towers 60, 62, 64 and to allow the molecular sieves 40 to remove the remaining water from the biofuel. However, such a strategy may lead to too much water being directed into the molecular sieves 40 such that the molecular sieves 40 may become saturated. As such, a trade-off may be made to balance the energy usage between the distillation units 60, 62, 64 and the molecular sieves 40 to generate biofuels with as low water content levels as possible without adversely affecting the molecular sieves 40 as well as other components of the dehydration sub-process.

Figure 6:
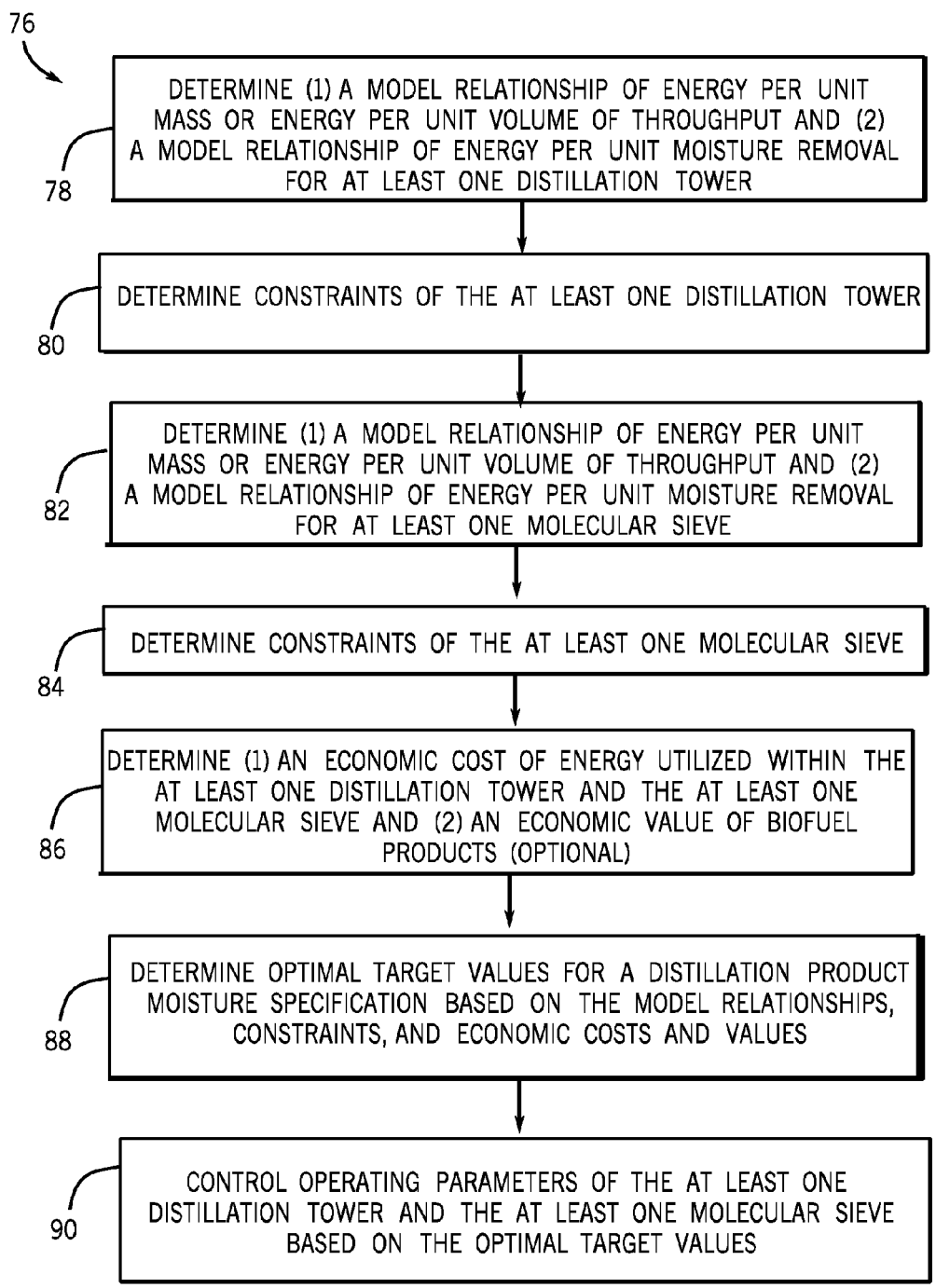
FIG. 6 is a flow chart of an exemplary method for controlling energy usage and water removal in a biofuel production plant.

Using the model predictive control techniques discussed in greater detail above, it may be possible to monitor, control, and optimize the sub-processes (in particular, the distillation/dehydration sub-processes) of the biofuel production process in order to implement optimized decisions regarding the trade-off between energy usage and the rate of water removal from the produced biofuels. For instance, FIG. 6 is a flow chart of an exemplary method 76 for controlling energy usage and water removal in a biofuel production plant 10. The method 76 may be integrated into the model predictive control method 48 of FIG. 3 above. Indeed, the method 76 may be one exemplary embodiment of the predictive model techniques discussed above.

In step 78, model relationships of (1) energy per unit mass or energy per unit volume of throughput and (2) energy per unit moisture removal of one or more distillation towers 60, 62, 64 may be determined. These model relationships may be determined using any of the techniques described above and may include, for instance, measuring the model relationships using process instruments. However, in many instances, the model relationships may not be easily measurable. Therefore, proxy values may be determined, for instance, based on inferential models and external calculations. For example, these model relationships may be determined based on measured input values such as steam consumption of the one or more distillation towers 60, 62, 64, steam temperature controller readings, energy and mass balance calculations, and so forth. In step 80, constraints of the one or more distillation towers 60, 62, 64 may also be determined. These constraints may include, but are not limited to, process constraints, energy constraints, equipment constraints, legal constraints, operator-imposed constraints, and so forth.

In step 82, model relationships of (1) energy per unit mass or energy per unit volume of throughput and (2) energy per unit moisture removal of one or more molecular sieves 40 may be determined. These model relationships may, again, be determined using any of the techniques described above and may include, for instance, measuring the model relationships using process instruments. However, again, the model relationships may not be easily measurable. Therefore, proxy values may also be determined, for instance, based on inferential models and external calculations. In step 84, constraints of the one or more molecular sieves 40 may also be determined. These constraints may also include, but are not limited to, process constraints, energy constraints, equipment constraints, legal constraints, operator-imposed constraints, and so forth.

In step 86, the economic cost of energy utilized within the one or more distillation towers 60, 62, 64 and the one or more molecular sieves 40 may optionally be determined. In addition, in step 86, the economic value of biofuel products may also optionally be determined. These economic cost and value determinations may optionally be used in the optimal target value determination step 88.

In step 88, optimal target values for a distillation product moisture specification may be determined. This determination of optimal target values may take into account the model relationships, constraints, and economic cost and value determinations discussed above with respect to steps 78, 80, 82, 84, and 86 of the method 76.

Then, in step 90, operating parameters of the one or more distillation towers 60, 62, 64 and the one or more molecular sieves 40 may be controlled based on the optimal target value determinations from step 88. The control of operating parameters of the one or more distillation towers 60, 62, 64 and the one or more molecular sieves 40 may include manipulation of any number of the process variables described above. For example, control of the one or more distillation towers 60, 62, 64 may include control of feed flow trajectories, syrup evaporation steam trajectories, overhead pressures, rectifier column 62 reflux, side stripper column 64 steam, valve settings, and so forth. Similarly, control of the one or more molecular sieves 40 may include control of 190-proof moisture, molecular bed cycle time, sieve feed rates, sieve inlet temperature and flow rates, sieve back pressure, and so forth.

The steps 78, 80, 82, 84, 86, 88, and 90 of the method 76 may be cyclically repeated during the biofuel production process. In addition, steps 78, 80, 82, 84, 86, 88, and 90 of the method 76 may be performed sequentially, simultaneously, or in any order relative to one another.

The control systems used to implement the present techniques may be open or closed. Open loop systems are only defined by the inputs and the inherent characteristics of the system or process. In the biofuel production process, the system may be the entire biofuel production plant, one sub-process of the biofuel production plant, such as the milling and cooking units 16, or control of a variable in a process such as the temperature of the milling and cooking units 16. In a closed loop system, the inputs may be adjusted to compensate for changes in the output where, for example, these changes may be a deviation from desired or targeted measurements. A closed loop system may sense a change and provide a feedback signal to a process input. Process units in the biofuel production system may be closed loop systems if they need to be regulated subject to constraints such as product quality, energy costs, process unit capacity, and so forth. Traditional PID controllers and other control systems such as ratio controls, feed-forward controls, and process models may be used to control biofuel production processes. A distributed control system may have many control schemes set up to control the process unit variables at the local control level.

The control systems may include a computer system with one or more processors, and may include or be coupled to at least one memory medium (which may include a plurality of memory media), where the memory medium may store program instructions according to the present techniques. In various embodiments, controllers may be implemented on a single computer system communicatively coupled to the biofuel production plant 10, or may be distributed across two or more computer systems, e.g., that may be situated at more than one location. In this embodiment, the multiple computer systems comprising the controllers may be connected via a bus or communication network.

The automated control system for the biofuel production plant 10 may include one or more computer systems which interact with the biofuel production plant 10 being controlled. The computer systems may represent any of various types of computer systems or networks of computer systems which execute software programs according to various embodiments of the present techniques. The computer systems may store (and execute) software for managing sub-processes in the biofuel production plant 10. The software programs may perform various aspects of modeling, prediction, optimization and/or control of the sub-processes. Thus, the automated control system may implement predictive model control of the sub-processes in the biofuel production plant 10. The system may further provide an environment for making optimal decisions using an optimization solver (i.e., an optimizer) and carrying out those decisions (e.g., to control the plant).

One or more software programs that perform modeling, prediction, optimization and/or control of the biofuel production plant 10 may be included in the computer systems. Thus, the systems may provide an environment for a scheduling process of programmatically retrieving process information relevant to the sub-processes of the biofuel production plant 10, and generating actions to control the sub-processes, and possibly other processes and aspects of the biofuel production plant 10.

The computer systems may preferably include a memory medium on which computer programs according to the present techniques may be stored. The term "memory medium" is intended to include various types of memory or storage, including an installation medium (e.g., a CD-ROM or floppy disks), a computer system memory or random access memory (e.g., DRAM, SRAM, and so forth), or a non-volatile memory such as a magnetic medium (e.g., a hard drive or optical storage). The memory medium may comprise other types of memory as well, or combinations thereof. In addition, the memory medium may be located in a first computer in which the programs are executed, or may be located in a second different computer which connects to the first computer over a network. In the latter instance, the second computer may provide the program instructions to the first computer for execution.

Also, the computer systems may take various forms, including a personal computer system, mainframe computer system, workstation, network appliance, Internet appliance or other device. In general, the term "computer system" may be broadly defined to encompass any device (or collection of devices) having a processor (or processors) which executes instructions from a memory medium. The memory medium (which may include a plurality of memory media) may preferably store one or more software programs for performing various aspects of model predictive control and optimization. A CPU, such as the host CPU, executing code and data from the memory medium may include a means for creating and executing the software programs.

The present techniques have been presented in the context of optimizing the control of energy usage rates and rates of water removal with respect to the production of biofuels. However, the present techniques may also be applied to any other systems where energy may be used to remove water from a product and where there may inherently be a trade-off between the energy usage and water removal rates from multiple sub-processes. In other words, any system where water may be removed from a product of the system using multiple sub-processes with varying energy usage rates may utilize the present techniques. For instance, the processing of liquor may be another application where the present techniques may be used. During the distillation sub-process, water will be removed as part of the distillation. However, if the liquor being produced will be of a higher proof, further water removal may be performed. Whether molecular sieves are used as the second water removal sub-process may depend on the specific implementation. However, the second water removal sub-process may be characterized by different energy usage rates than the distillation sub-process as well as other particular aspects which may be considered by the predictive model-based techniques described herein to determine appropriate target values for operating parameters of the sub-processes.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A non-transitory computer readable medium, comprising:
   computer code programmed on the non-transitory computer readable medium, wherein the code comprises instructions for optimizing energy usage rates and rates of water removal in a production system, the instructions comprising:
   instructions for determining a model relationship of energy per unit mass or energy per unit volume of throughput of at least one distillation tower, and determining a model relationship of energy per unit moisture removal of the at least one distillation tower;
   instructions for determining constraints of the at least one distillation tower;
   instructions for determining a model relationship of energy per unit mass or energy per unit volume of throughput of at least one molecular sieve, and determining a model relationship of energy per unit moisture removal of the at least one molecular sieve;
   instructions for determining constraints of the at least one molecular sieve;
   instructions for executing an integrated dynamic multivariate predictive model to determine optimal target values for a distillation product moisture specification based on the determined model relationships and constraints; and
   instructions for dynamically controlling operating parameters of the at least one distillation tower and operating parameters of the at least one molecular sieve based on the optimal target value determinations, wherein the instructions for dynamically controlling the operating parameters include instructions for determining a balance between separating water from a biofuel product using the at least one distillation tower and removing water from the biofuel product using the at least one molecular sieve;
   wherein the recited instructions are cyclically executed during operation of the production system.

2. The non-transitory computer readable medium of claim 1, wherein the code comprises instructions for determining an economic cost of energy utilized within the at least one distillation tower and the at least one molecular sieve and instructions for determining the economic value of biofuel products.

3. The non-transitory computer readable medium of claim 2, wherein the instructions for determining optimal target values for the distillation product moisture specification are also based on the economic cost and economic value determinations.

4. The non-transitory computer readable medium of claim 1, wherein the code comprises instructions for measuring the model relationship of energy per unit mass or energy per unit volume of throughput of the at least one distillation tower using process instruments, and instructions for measuring the model relationship of energy per unit moisture removal of the at least one distillation tower using process instruments.

5. The non-transitory computer readable medium of claim 1, wherein the code comprises instructions for measuring the model relationship of energy per unit mass or energy per unit volume of throughput of the at least one molecular sieve using process instruments, and instructions for measuring the model relationship of energy per unit moisture removal of the at least one molecular sieve using process instruments.

6. The non-transitory computer readable medium of claim 1, wherein the non-transitory computer readable medium is disposed in a process controller for controlling energy usage and water removal in a biofuel production plant.

* * * * *